(12) United States Patent
Fathollahi et al.

(10) Patent No.: US 10,243,608 B2
(45) Date of Patent: Mar. 26, 2019

(54) PROTECTIVE CASE FOR MOBILE DEVICE

(71) Applicant: Incipio, LLC, Irvine, CA (US)

(72) Inventors: Andy Fathollahi, Corona Del Mar, CA (US); Peter Tu, Long Beach, CA (US); Timothy Hemesath, Clovis, CA (US)

(73) Assignee: Incipio, LLC, Irvine, CA (US)

( * ) Notice: Subject to any disclaimer, the term of this patent is extended or adjusted under 35 U.S.C. 154(b) by 0 days.

(21) Appl. No.: 15/200,372

(22) Filed: Jul. 1, 2016

(65) Prior Publication Data

US 2017/0005688 A1 Jan. 5, 2017

Related U.S. Application Data

(60) Provisional application No. 62/188,438, filed on Jul. 2, 2015.

(51) Int. Cl.
*H04B 1/38* (2015.01)
*H04B 1/3888* (2015.01)

(52) U.S. Cl.
CPC .................... *H04B 1/3888* (2013.01)

(58) Field of Classification Search
CPC .... H04B 1/3888; H04B 1/0206; H04M 1/815
See application file for complete search history.

(56) References Cited

U.S. PATENT DOCUMENTS

| 2012/0199501 A1* | 8/2012 | Le Gette | F16M 11/04 206/45.24 |
| 2015/0108012 A1* | 4/2015 | Poon | F16M 13/00 206/45.23 |
| 2015/0153791 A1* | 6/2015 | Wong | G06F 1/20 361/679.54 |

* cited by examiner

*Primary Examiner* — Tuan Pham
(74) *Attorney, Agent, or Firm* — Manatt, Phelps & Phillips, LLP

(57) ABSTRACT

A protective case for a portable mobile device is disclosed. The protective case comprises a shell that defines a compartment for receiving and retaining a mobile device, a cover panel, and a connector component. The shell has a main panel that includes an aperture and a subpanel that is hinged at a first side within the aperture and reversibly attached to the aperture via mechanical protrusions or detents at a second side so that it can rotatably attach and detach, or snap, into and out of the main panel. The hinge may be formed by one or more flexible layers overlaid on the shell or via mechanical swivel joint such as a pin and socket connection. A connector portion connects the cover panel to the shell and forms a flexible spine between the cover panel and the shell. The connector portion is comprised of opposing inner and outer layers that are overlaid over the internal and external facing surfaces of the shell and cover panel. The main panel of the shell is configured to receive and retain the mobile device within its compartment and may be snap-fitted over the mobile device. In operation, the case can be opened and the subpanel detached from the main panel to allow the main panel to rotate relative to the subpanel and rest on the inner surface of the cover component to provide varied viewing/operating positions to the user.

20 Claims, 17 Drawing Sheets

PROTECTIVE CASE FOR MOBILE DEVICE

INCORPORATION BY REFERENCE TO RELATED APPLICATIONS

This application claims benefit under 35 U.S.C. § 119(e) from U.S. Provisional Application No. 62/188,438, filed on Jul. 2, 2015, which is hereby incorporated by reference in its entirety.

BACKGROUND

Field of the Invention

This patent document relates to protective enclosures for portable or mobile electronic devices, and in particular to a unique and inventive implementation and manufacture of a case that includes a hinged subpanel that reversibly detaches from a main panel to facilitate multiple viewing/operating positions.

Description of the Related Art

Mobile consumer electronic products, such as smart and cellular phones, computing tablets, MP3/audio/video players, gaming devices and laptops are continuously and rapidly evolving to meet expanding consumer demands. Such devices are becoming more and more powerful, connected, and interactive, and employ bigger and bigger screens. With each new generation of device, users are looking to improve ways to protect, conveniently and elegantly transport, and use such devices to maximize functionality and enhance user experience.

The inventors here have recognized that there is a continued need for a light weight and slim wallet or folio-type protective cases for mobile electronic devices that are capable of standing the case and mobile device on edge so as to provide multiple viewing/operating positions, yet are capable of concealing the mobile device from view and protecting the screen when the case is in the closed position.

SUMMARY

Disclosed are numerous aspects of unique and inventive protective cases configured to receive, retain and protect a mobile device. Such mobile devices typically include a front face and a back face the difference between which defines the height or thickness of the mobile device, a perimeter defined by top-end, bottom-end, right, and left sides residing between the front and back faces, and corners defined at the intersecting regions of the sides. The cases may be for a mobile device that is in the form of a tablet, a mobile phone, an MP3 audio player, a gaming device, or other portable handheld electronic device and may have one or more touchscreens, including on its front face and/or back face.

Such protective cases are, in a first aspect, generally comprised of three primary components: a molded shell, a cover, and a connector component. The shell component is configured to include a compartment dimensioned to reversibly receive and retain the mobile device. The compartment may include one or more openings so that the user may access various user interfaces of the mobile device (e.g., touch screen(s), home button, power and volume buttons, speaker and charging connections, etc.) while the mobile device is retained within the compartment.

The shell may be comprised of a main panel and a detachable subpanel, each of which has corresponding inner and outer faces. The main panel defines the compartment and includes an aperture that is dimensioned to receive the subpanel. The subpanel is hinged along a first side or location within the aperture formed in the main panel and anchored on a second side to the cover via the spine. One or more attachment protrusions are provided and configured to mechanically engage, latch or clip the subpanel into the aperture of the main panel at or near the second side or location to thereby secure the subpanel to the main panel of the shell.

When the subpanel is attached or otherwise secured at the second location, the subpanel and main panel maintain a fixed relative position and orientation to one another. The subpanel is dimensioned such that when it is positioned within the aperture of the main panel, there is a slot or gap between opposing edges of the subpanel and the adjacent edge of the aperture. The aperture also includes indentation or a lip at one or more regions along its defining wall borders that is dimensioned to engage with the corresponding edge or lip regions of the subpanel so as to serve to stop the subpanel from swinging into the mobile device compartment formed by the shell and its main panel.

The cover generally is comprised of a cover panel configured or dimensioned to include a perimeter that is coextensive in dimension with the front face of the mobile device so that it may cover the entirety of the touch screen of the mobile device. The connector component connects the cover panel to the shell via the subpanel. The connector component can be comprised of two opposing flexible inner and outer layers (e.g., synthetic and/or organic fabrics or textiles) that are overlaid on respective opposing inner and outer sides of the cover panel and shell, including the subpanel. The overlaid layers may form the hinge that connects the subpanel to the main panel of the shell portion and attaches the shell component to the cover component. The connector component further includes a flexible spine portion that is adapted to allow relative movement between the shell and cover components and to allow the cover to open and close over the shell when the case is opened and closed.

The shell may be made of any suitable material that is capable of retaining the mobile device within the shell compartment, for example via a snap fit over the device. In one aspect the shell may be manufactured of a flexible polymer such as polycarbonate and/or fiber (e.g., carbon or Kevlar) reinforced plastic. The shell may be more rigid, less rigid, or have generally the same rigidity as the front cover or panel, which may be formed of the same material as the shell or some other polymer or cardboard or other material capable of having the planar stability or rigidity suitable for maintaining sufficient perimeter area to cover the screen surface area of the mobile device contained within the shell. The main panel of the shell may be formed of the same or different material than the subpanel of the shell.

In one aspect, the spine portion of the connector component may be a region where the two flexible layers are directly adhered to one another or otherwise attached or where there is an interposed component that allows for flexibility in that region akin to that of a book spine. Alternatively the spine portion may be formed of a different material from that used in other regions of the flexible layers all together or may be comprised of a more conventional mechanical hinge that is attached or incorporated into the connector component, like those used in a conventional door mount, but with one side connected to the subpanel of the shell portion and the other side connected to the cover panel, for example via overlaying the inner and/or outer flexible layers.

The inner and outer layers are generally configured to overlay the mid-regions of opposing sides of the main and subpanel panel and the cover panel and form a flexible spine between the cover and shell as well as to form the hinge between the sub-panel and main panel. Recessed attachment regions may be provided in the shell component panels so that the outer surfaces of the attached layers reside at or below the height of the adjacent regions of the shell panels. Such a configuration can mitigate the layers catching an edge during use or peeling-off as they would be effectively embedded within the panels at or below the surrounding surfaces.

The inner and outer layers may be made of a flexible natural or synthetic material (e.g., a synthetic leather) or fabric. The inner layer, which is configured to be in direct contact with the mobile device may be formed of a soft lining, felt or micro-fiber material that is not abrasive to avoid imparting blemishes or scratches to the mobile device. The outer layer may be formed of a more durable textured material, such as textured leather polyurethane.

The inner layer may be configured to cover some, all, or most of the mobile device compartment defined by the shell portion including the inner faces of the main and subpanels of the shell. The inner layer may also cover the inner face of the cover panel, which is configured to be in contact with the front face of the mobile device when the case is in the closed position.

In operation, when the case is open, the subpanel, which is anchored to the spine and the cover, may be detached by the user from the main panel. Detaching the subpanel from the main panel allows the main panel to pivotally rotate relative to the subpanel at the hinge so that the case can be folded over itself to form different viewing or operating positions. For example, once the subpanel is detached or disengaged from main panel, the main panel can rotate at the hinge (between the subpanel and main panel) away from the spine over the inner face of the cover. Once rotated over the inner face of the cover, the proximate edge (e.g., left edge) of the main panel of the shell can be position to sit atop the inner face of the cover panel to provide the desired an angled viewing position.

Rather than adding weight to the case to bias the retention of the case in the desired viewing position, is facilitated by the force resulting from the weight of the mobile device contained within the case. Thus, the case may be manufactured or configured with light-weight materials and so that it would not hold an angled viewing position by itself without the mobile device contained therein. Rather, in one aspect, the case is preferably configured to be bias to a closed position where the subpanel and main panel are generally parallel to one another and not rotated relative to one another. This may be achieved by securing the layers over the main and subpanel of the shell while the subpanel is closed and thus the overlaid layers would naturally be in tension when the when the subpanel is opened and therefor bias the subpanel into the closed position. The inner face of the cover may include one or more slots or openings in the inner layer so as to create a wallet for credit cards and the like.

A corresponding method of manufacture is also disclosed. A shell component (including a main panel and subpanel) and a cover component as each is described above is molded or formed and then overlaid on their inner and outer faces with the flexible inner and outer layers. A hinge, which connects the subpanel to an aperture in the main panel of the shell, is provided between the subpanel and the main panel along a first side or location. The hinge may be formed by the overlaid inner and/or outer layers. The inner and/or outer layers may be overlaid when the subpanel and the main panel are in the closed position to bias those panels into the closed position. Slots are formed in the inner layer over the cover panel to form a wallet or credit card holder. Regions of the inner layer adjacent to the slot are configured to be free to separate from the underlying layer to allow the credit card or similar item to slide through the slot and at least partially into the gap or space between the two layers and/or the cover panel.

Each of the foregoing and various features, constructions, configurations, and aspects, together with those set forth in the claims and summarized above or otherwise disclosed herein, including the drawings, may alone or in any combination form claims for a case device, apparatus, system, method of manufacture, and/or use without limitation.

DETAILED DESCRIPTION OF THE EMBODIMENTS

Figure 1:
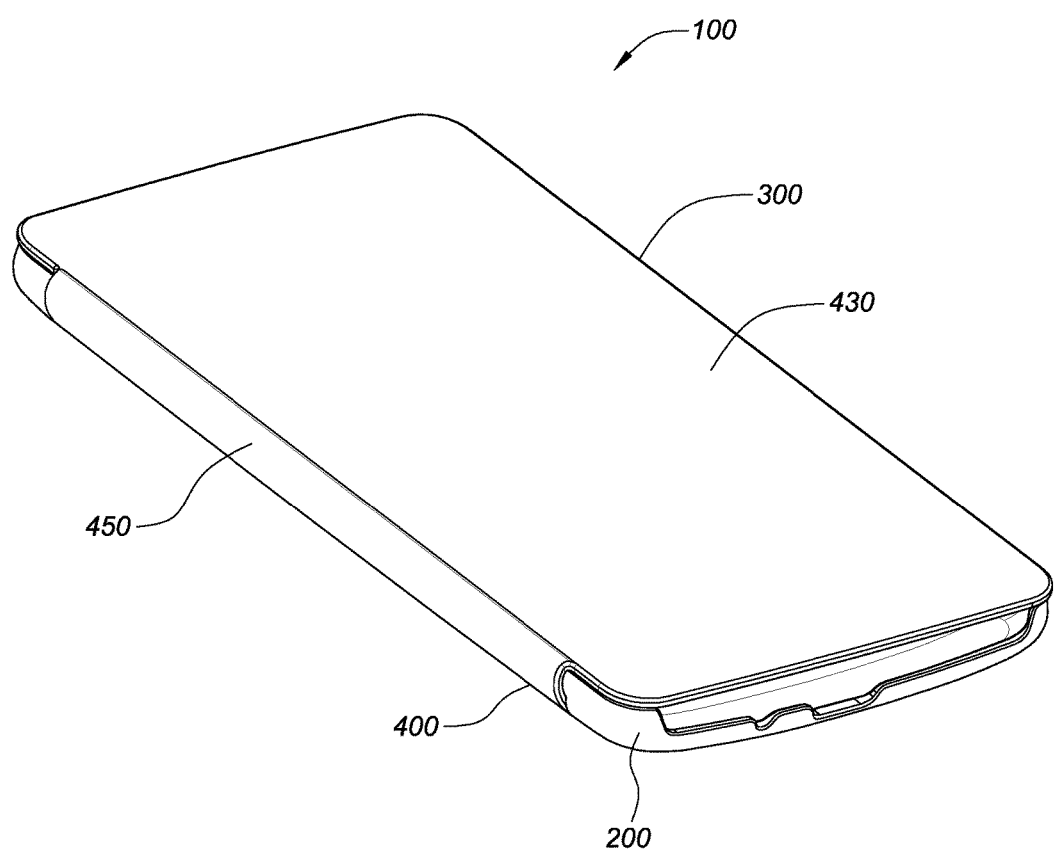
FIG. 1 is a line drawing of a perspective view of a protective case in a completely closed position with the cover side up.

Various features, aspects, and advantages of the protective cases disclosed are described below with reference to the drawings, which are intended to illustrate but not to limit the invention. In the drawings, like reference characters denote corresponding features consistently throughout similar embodiments.

As illustrated in the accompanying drawings, the protective case 100 is generally configured to receive and protect a mobile device. The case 100 generally includes a shell component 200 comprised of multiple interlocking panels and a cover component 300 comprised of a cover panel 305 that is attached to the shell via a spine 450. The two components are in the illustrated embodiments attached to one another via a connector component 400, which is comprised of inner and outer layers 410, 430 that overlay the shell and cover panels.

The protective case 100 may be for a mobile device that is in the form of a tablet, a smart or mobile phone, an MP3 audio player, a gaming device, or other portable handheld electronic device. Such mobile devices typically include a front face and a back face the difference between which defines the height or thickness of the mobile device, a perimeter defined by top-end, bottom-end, right, and left sides residing between the front and back faces, and corners defined at the intersecting regions of the sides. The entirety, most or a portion of the front face of the mobile device may be comprised of a touch screen. Screens may be provided on other sides as well including the back face. The device may have one or more buttons, controls and/or ports included along its perimeter walls and a camera lens or window and speaker or microphone port on its back face.

The shell component 200 is generally defined by a top 232, bottom 234, left 236 and right 238 sides and front (inner faces) and opposing rear (outer faces) sides 210 and 230 respectively. The shell component 200 may be in the form of contoured molded polymer panels including a main panel 220 and a rotatable subpanel 240 residing therein. The front side or face 210 of the shell 200 defines a compartment 205 that is configured to receive and retain the portable electronic device, while allowing users to access the touchscreen on the front face of the electronic device and to control buttons and ports on the perimeter walls of the device.

In the illustrated embodiment, the inner face of the main panel 220 of the shell 200 defines a compartment that is configured to snap onto and retain an LG G4™ smartphone (not shown) securely within the cavity or compartment defined by the contoured walls of the main panel 220. Notably, the shell 200 is configured such that the main panel 220 alone, without the subpanel 240, defines a retention compartment that covers at least partially all or most of the four sides and the back face of the mobile device and is adapted to snapping onto or over the mobile device and securely retaining the electronic device for which it is configured to receive. The subpanel 240, therefore, is not required for retention of the mobile device in the shell 200. Rather, the main panel 220 can accomplish this undertaking without contribution from the subpanel 240.

The main panel 220 includes an aperture 221 wherein the subpanel 240 resides and is connected thereto via a hinge 420 on one side and mechanical protrusions 246, 248 or detents on an opposing side. The combination of the hinged connection on one side and the mechanical detents on the other, allows the subpanel 240 to rotatably lock and unlock into and out of the main panel 220.

Figure 2:
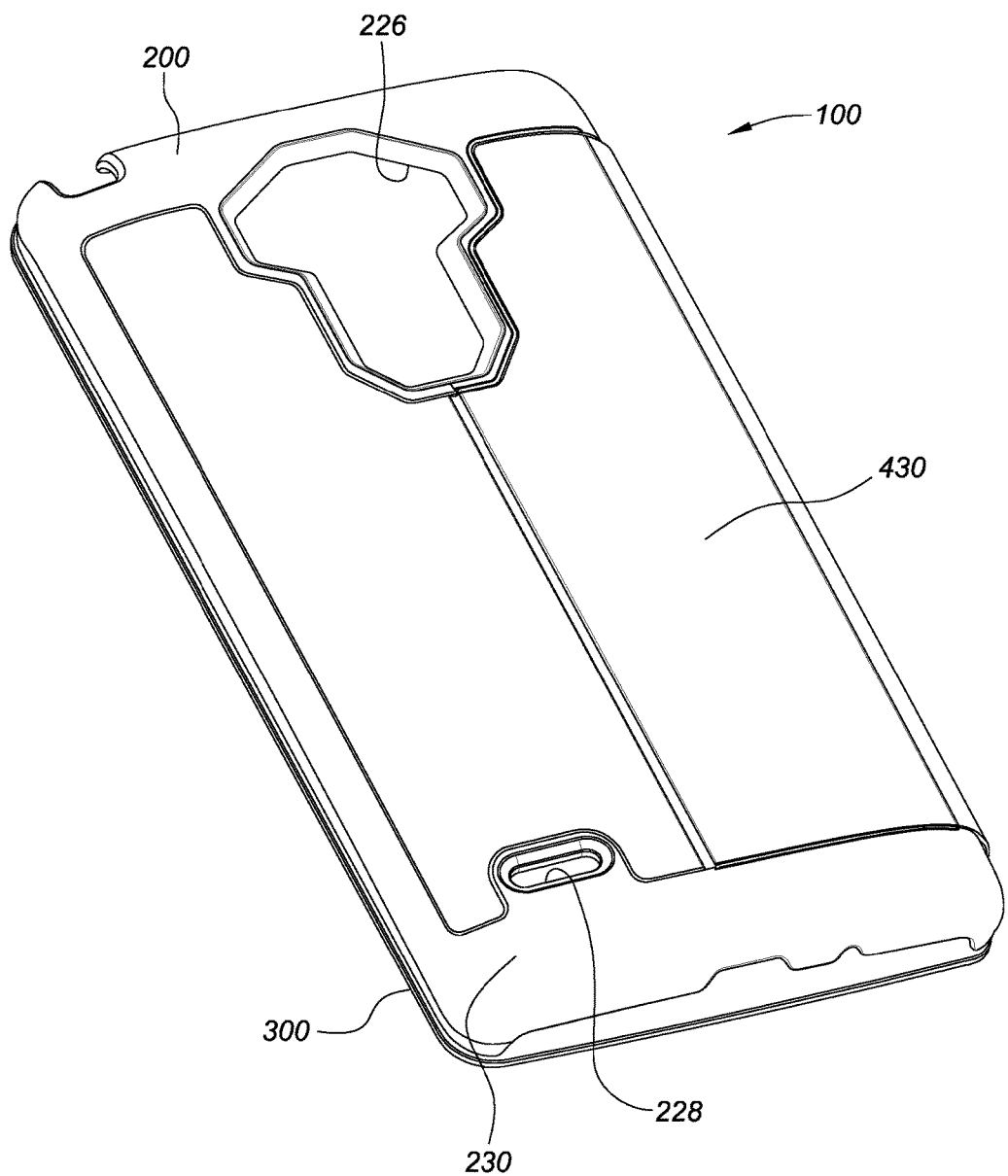
FIG. 2 is a line drawing of a perspective view of the protective case of FIG. 1 in a completely closed position with the cover side down and the shell-side up.
Figure 3A:
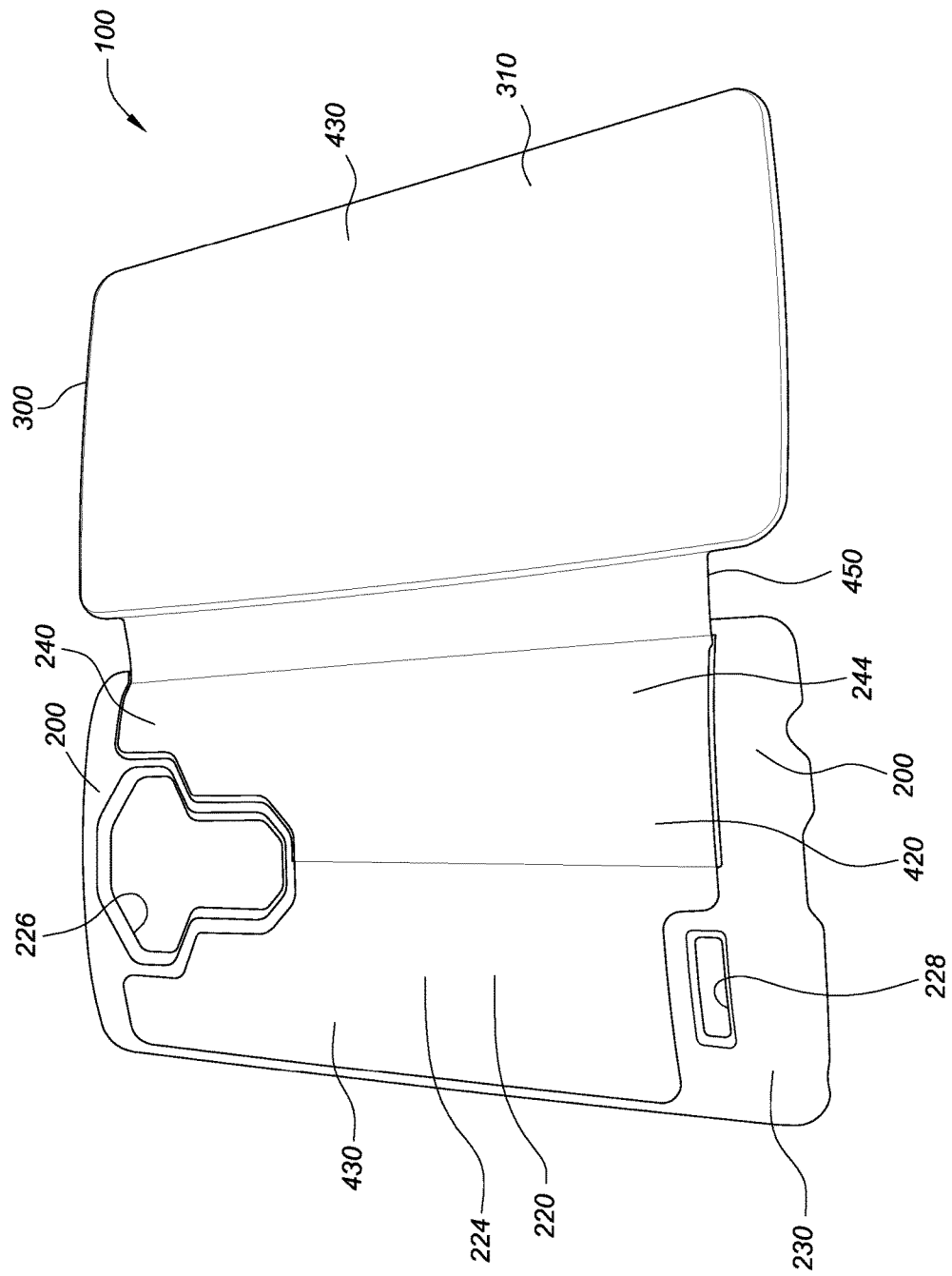
FIG. 3A is an external perspective view of the protective case of FIG. 1 showing the external faces of the case, the cover is swung open at the spine that resides between the cover and the shell with the subpanel of the shell remaining attached to the main panel of the shell.
Figure 3B:
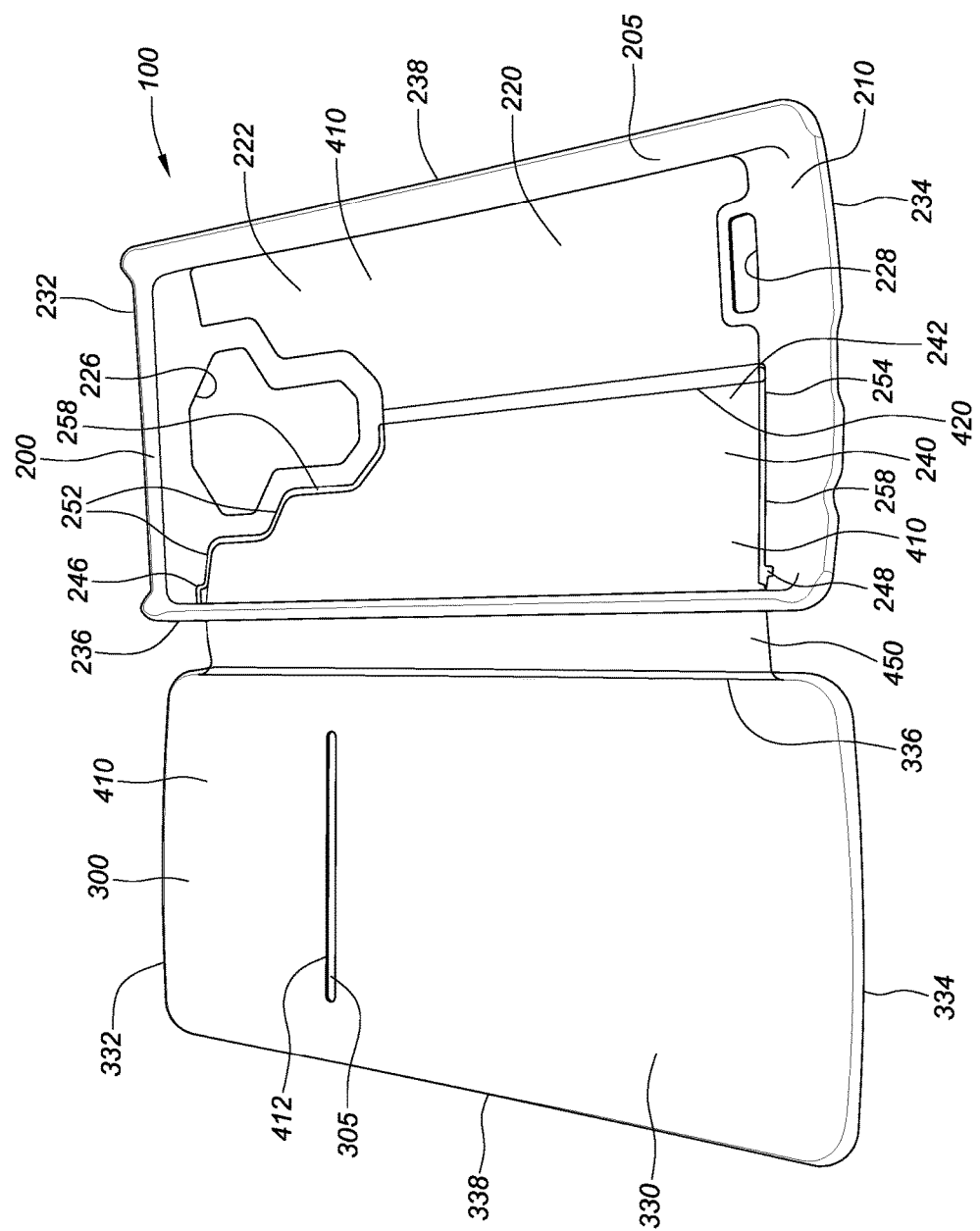
FIG. 3B is an internal perspective view of the protective case of FIG. 1 showing the internal faces of the case and a first viewing/operating position or configuration, the cover is swung open at the spine that resides between the cover and the shell with the subpanel of the shell remaining attached to the main panel of the shell.
Figure 4A:
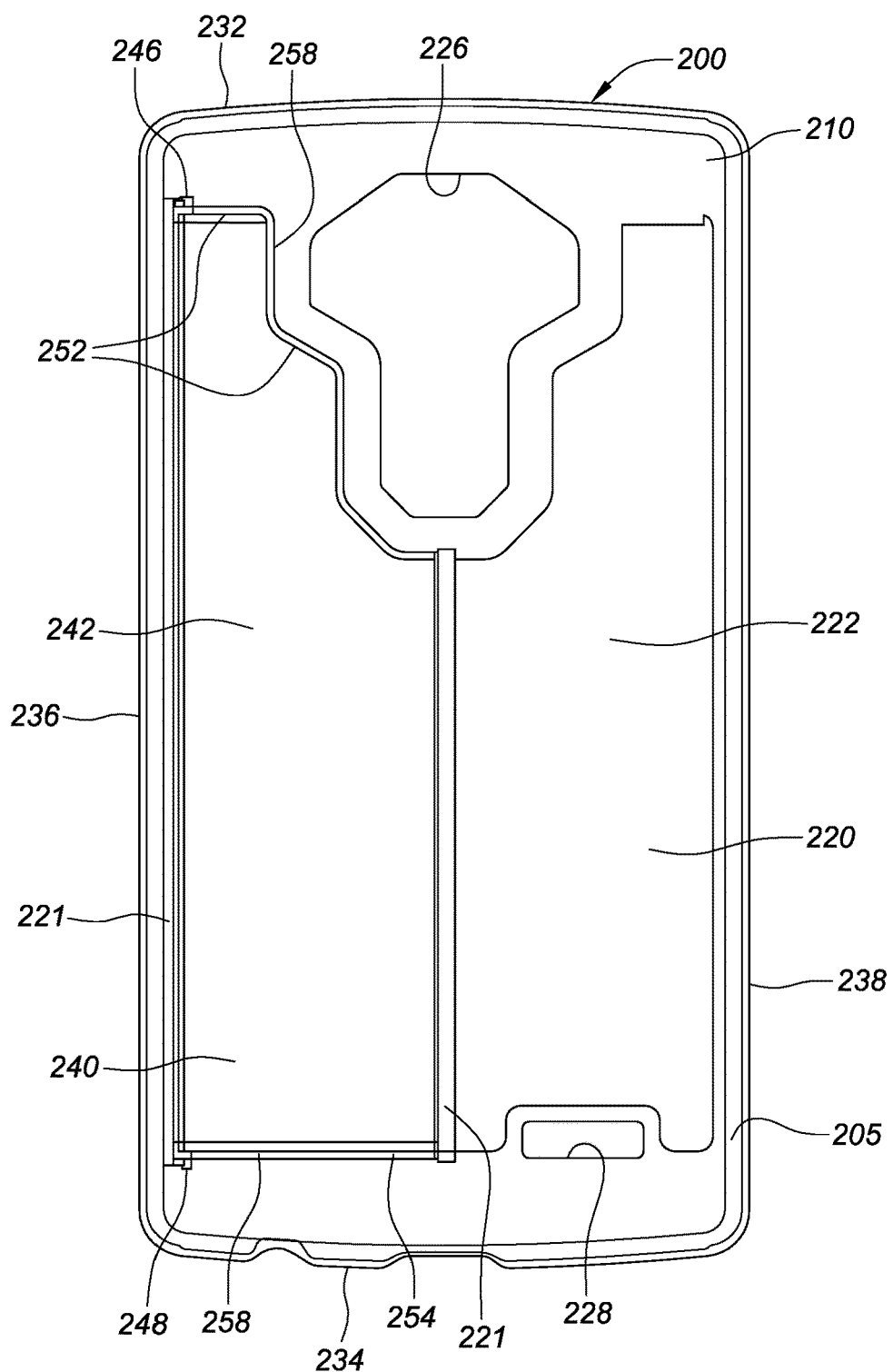
FIGS. 4A-4B illustrate internal and external views respectively of the shell component of the protective case of FIG. 1 alone without the cover panel or the overlaid layers. The subpanel is attached to the main panel of the shell in the closed position.
Figure 4B:
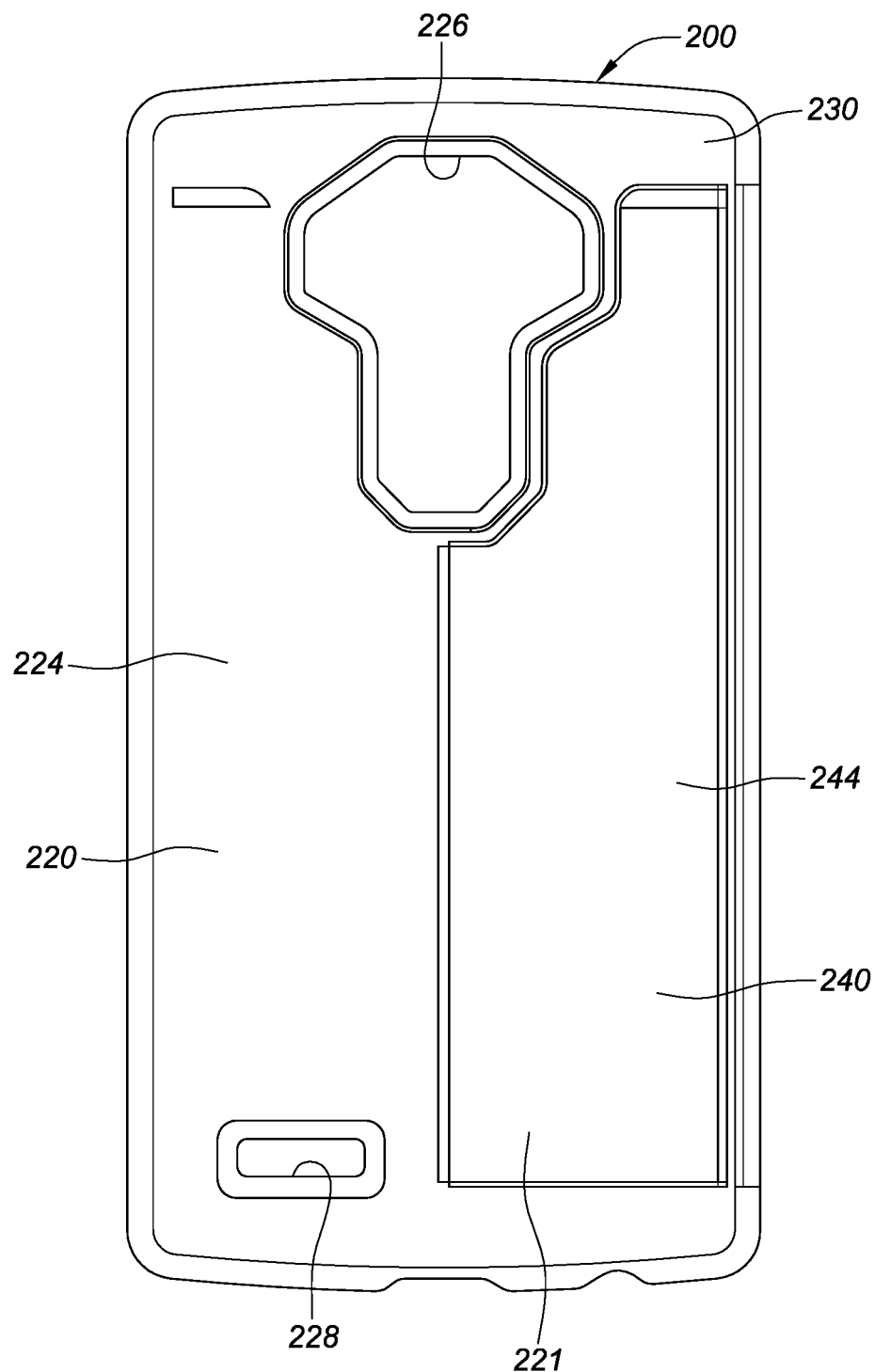
Figure 5:
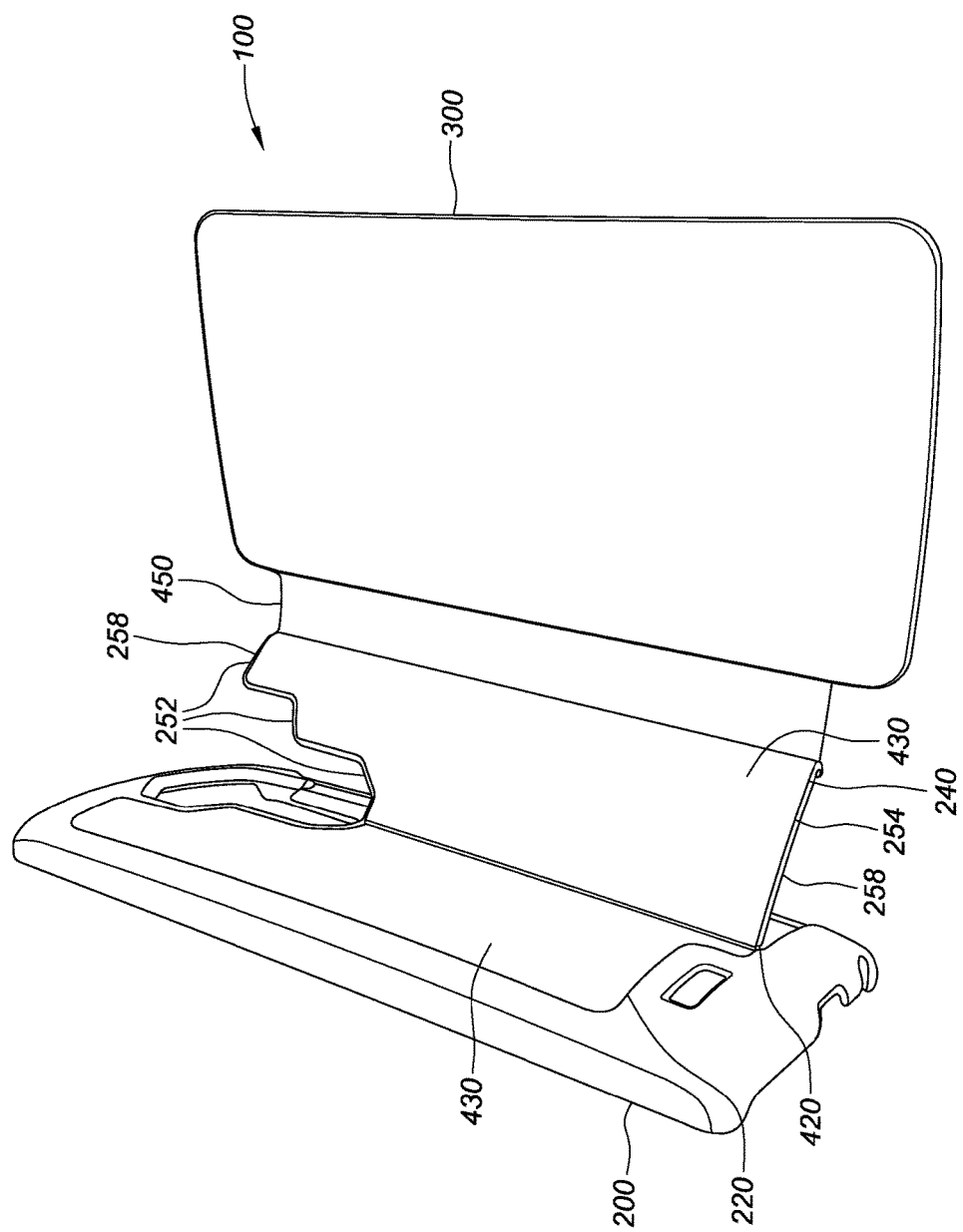
FIG. 5 is a perspective view of the protective case of FIG. 1 with the shell folded outwardly at the spine and the main panel of the shell detached from the subpanel and rotated away from the subpanel along the hinge residing between the subpanel and main panel so as to form a second viewing/operating position or configuration.
Figure 6A:
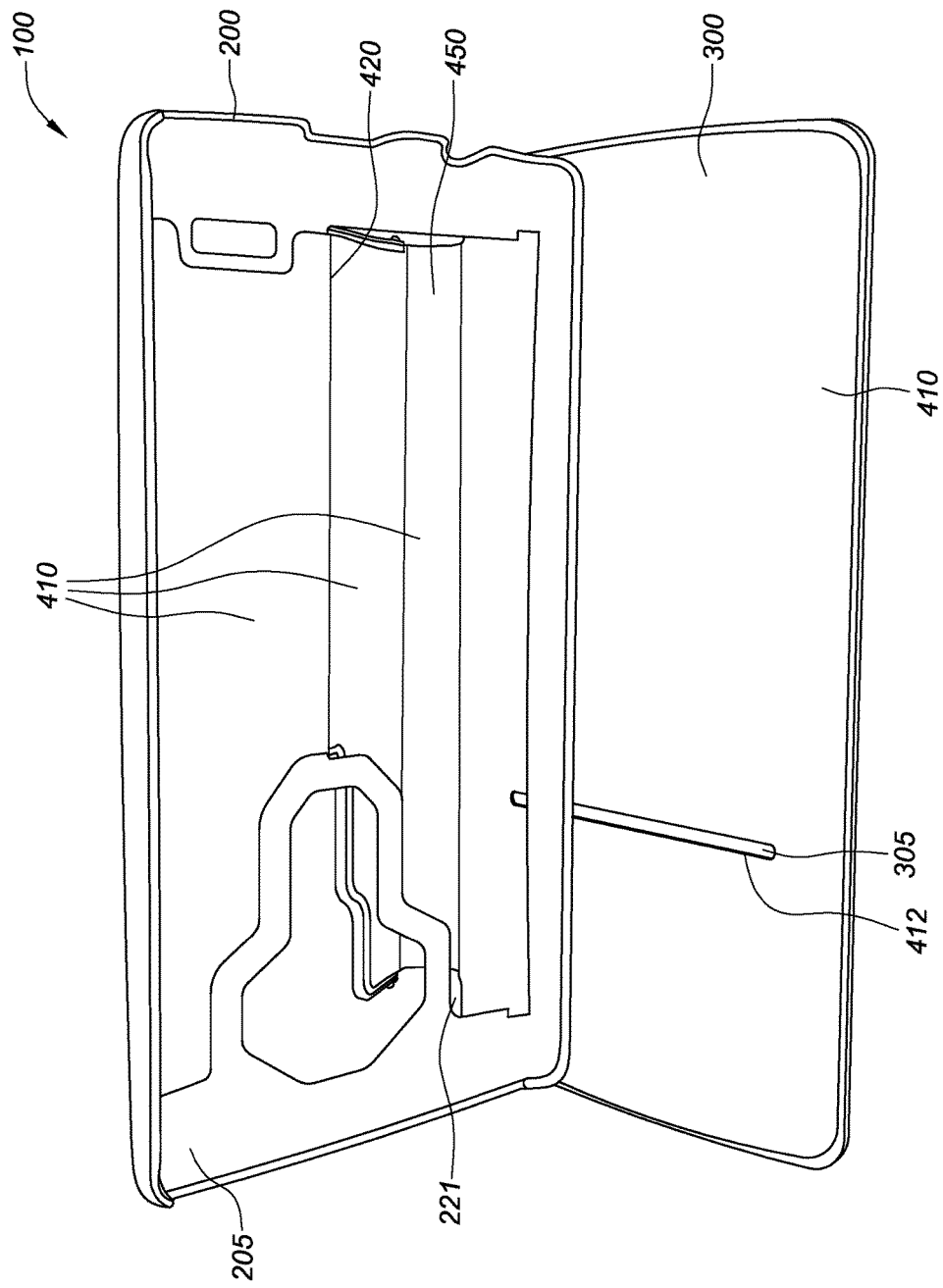
FIGS. 6A-6B are perspective views of the protective case of FIG. 1 with the shell folded at the spine over the cover and the main panel of the shell detached from the subpanel of the shell and rotated along the hinge there-between. The left edge of the main panel of the shell resting on the inner face of the cover so as to form a third viewing/operating position(s) or configuration(s).
Figure 6B:
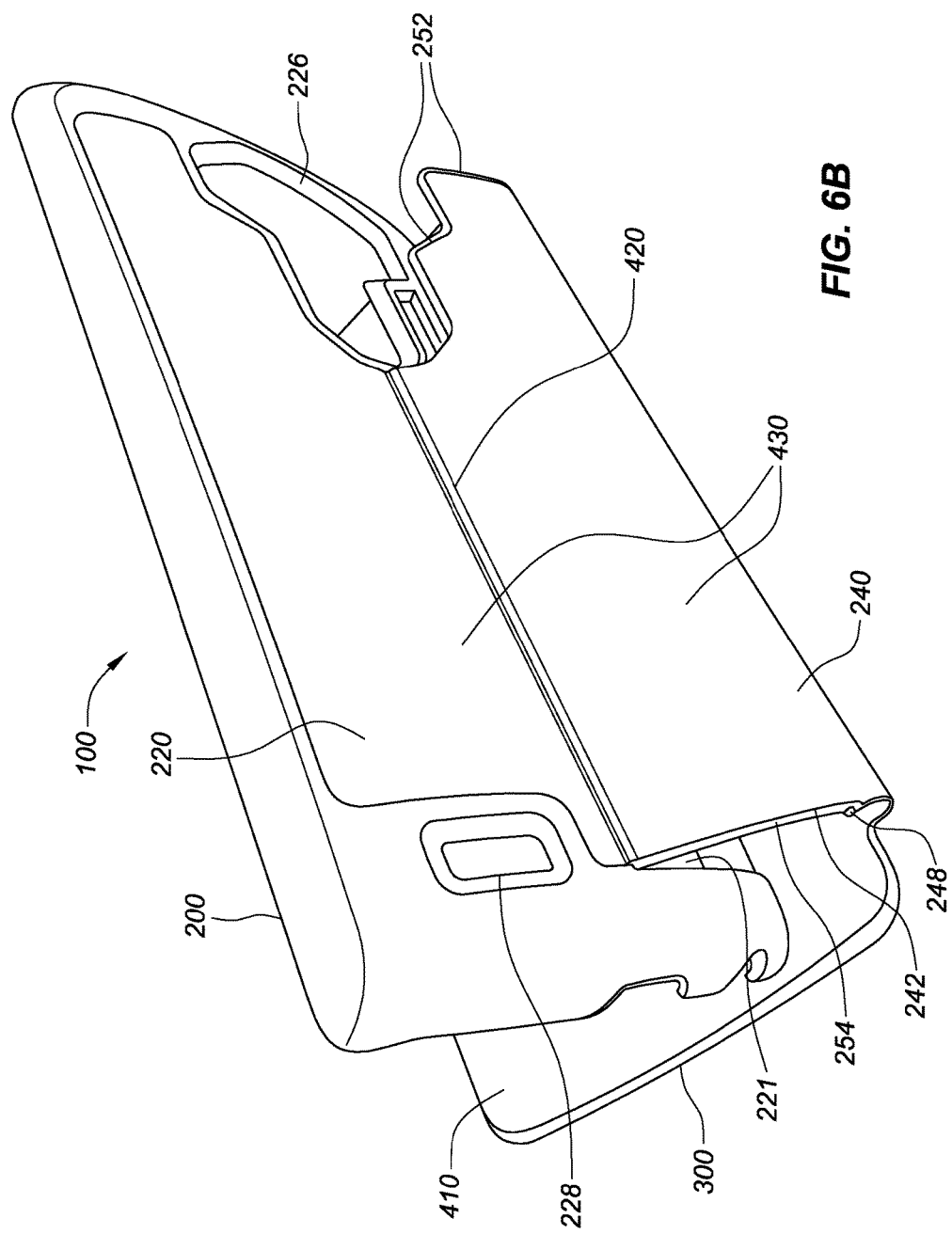
Figure 6C:
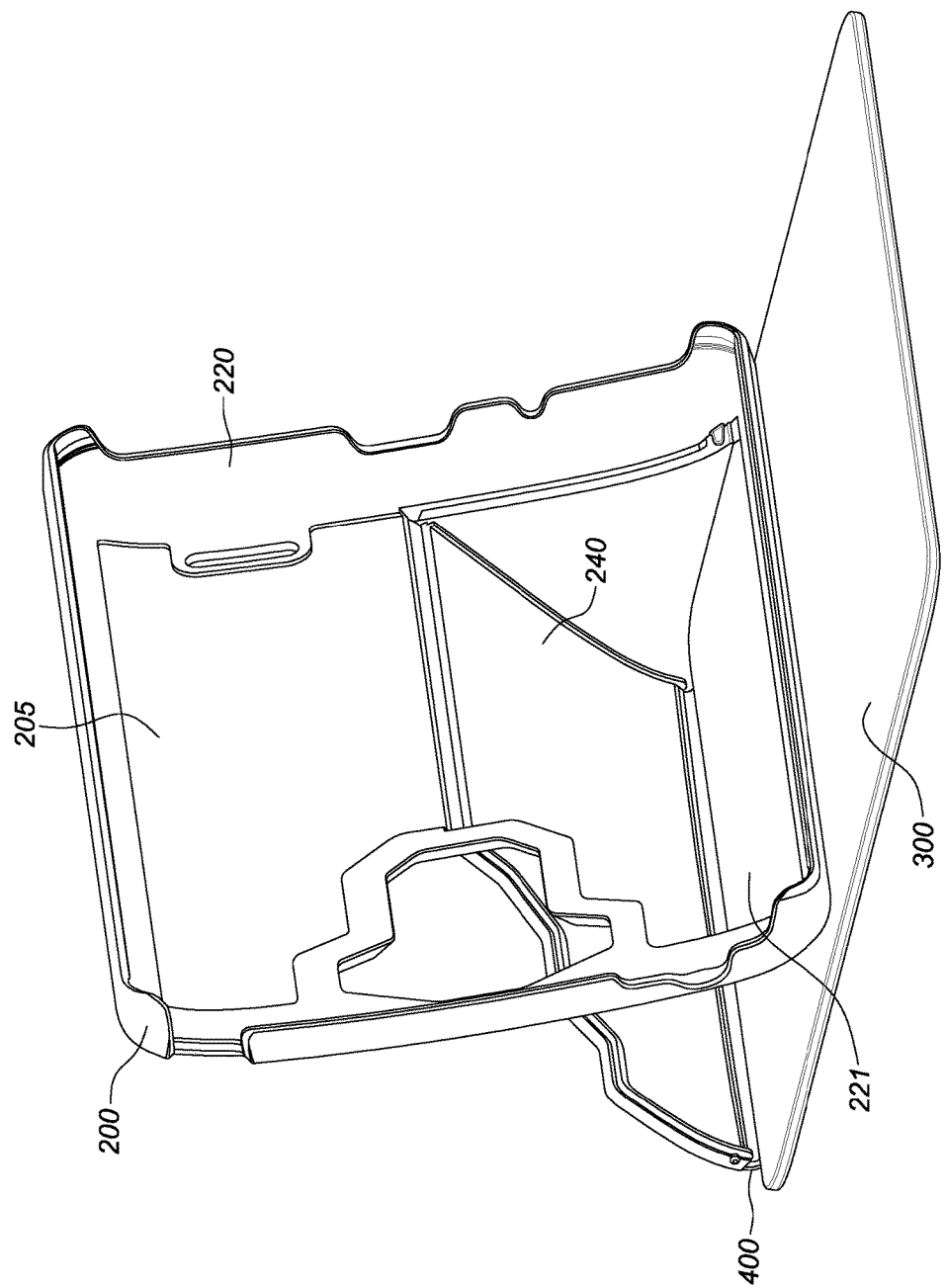
FIGS. 6C-6F are line drawings of various perspective views of the protective case of FIG. 1 in the general configuration illustrated in FIGS. 6A-6B.
Figure 6D:
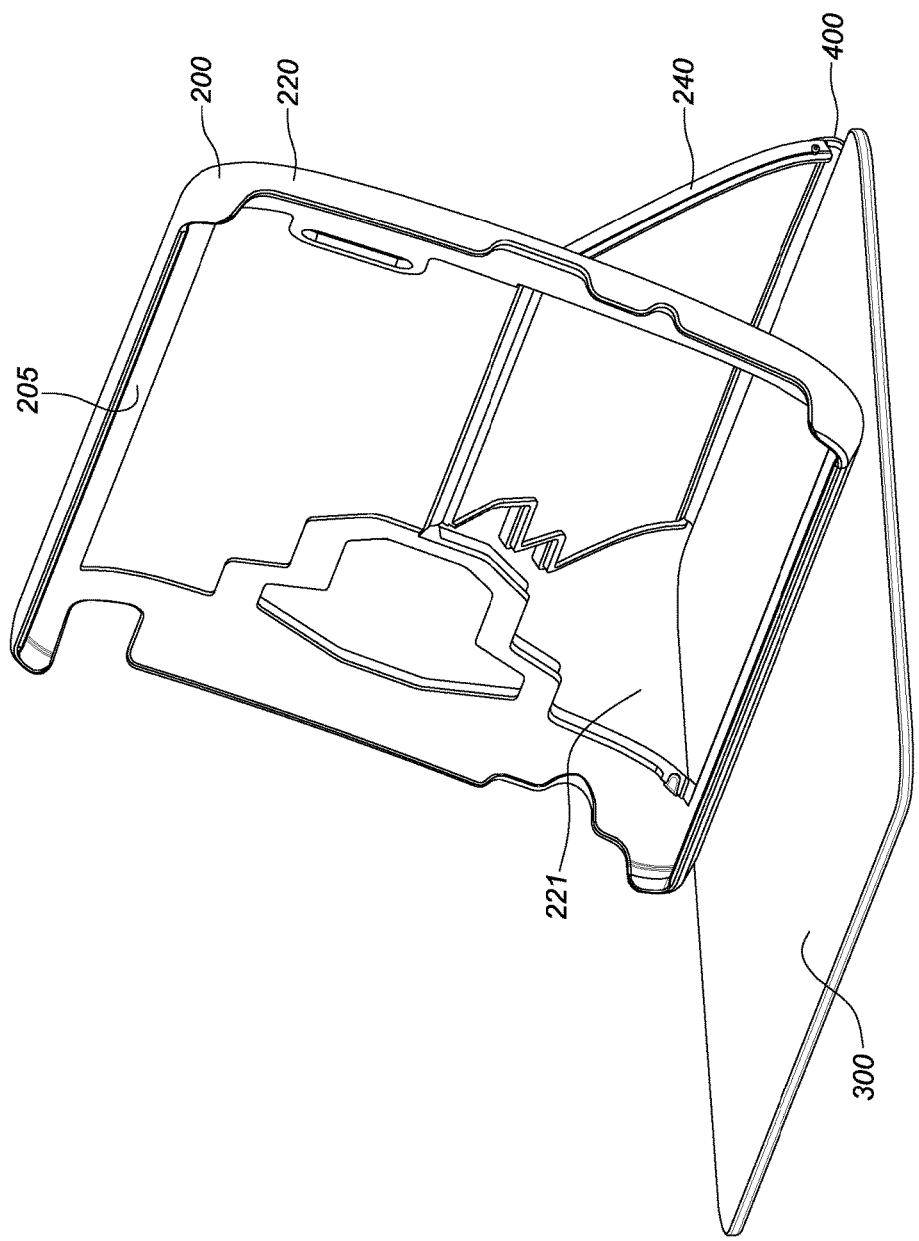
Figure 6E:
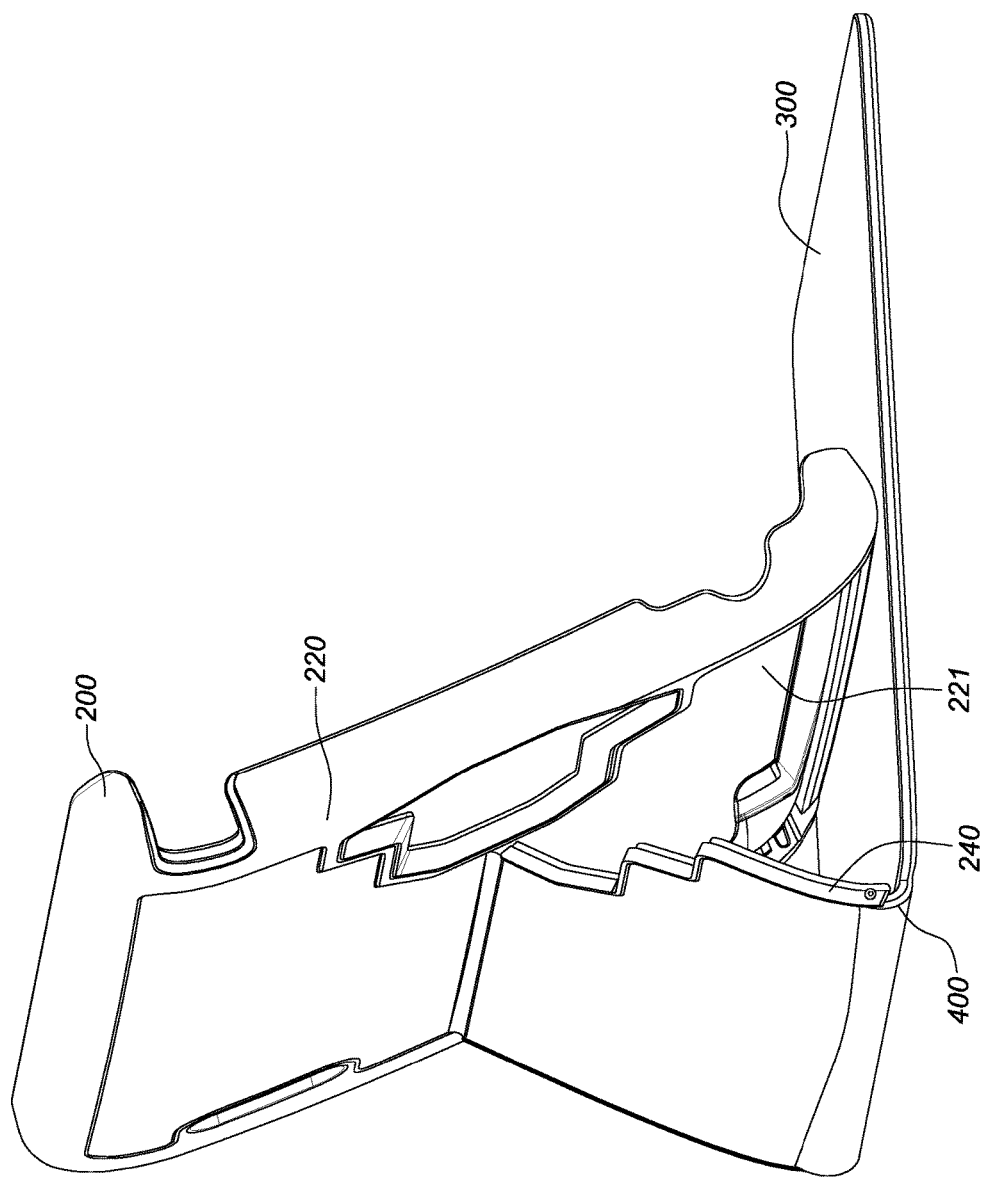
Figure 6F:
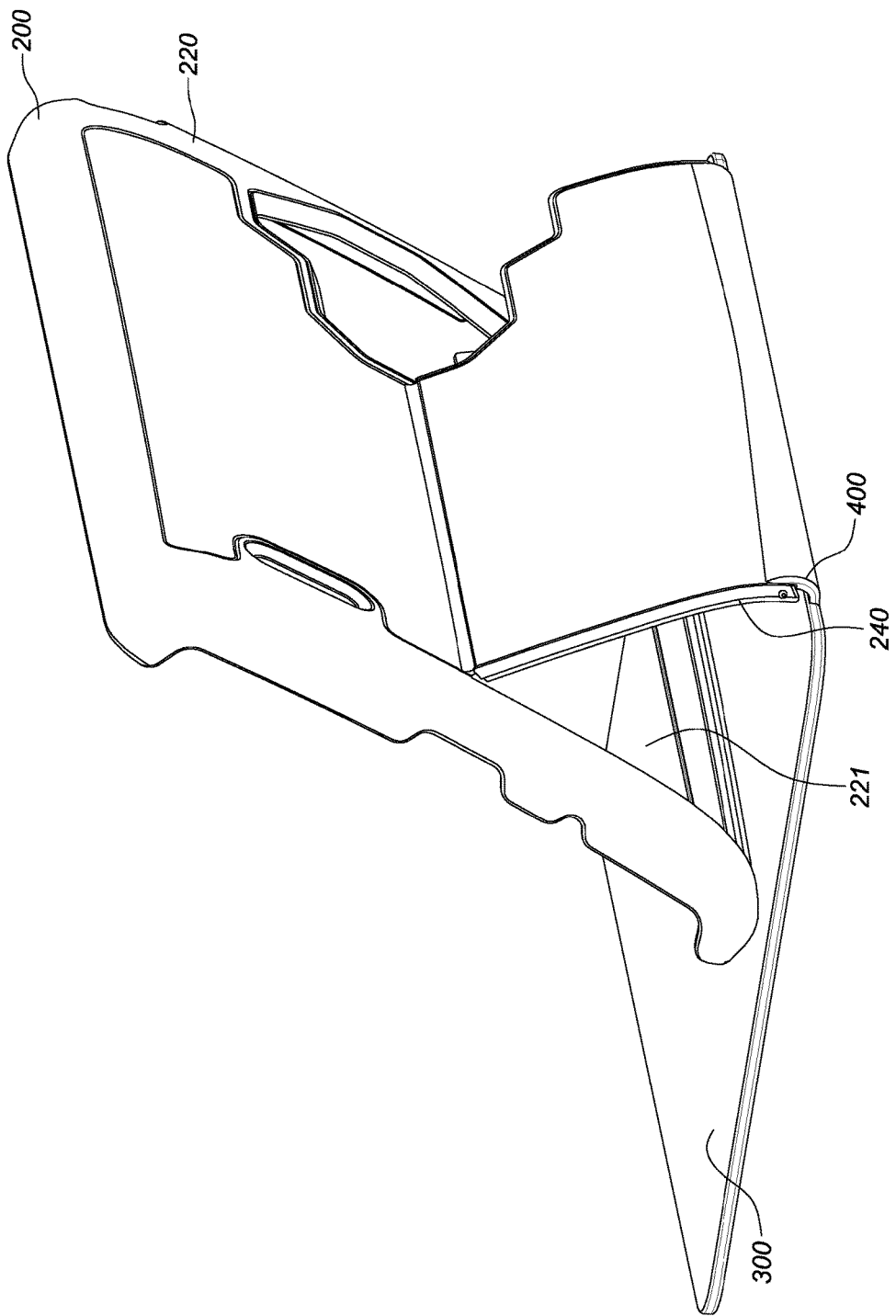
Figure 7:
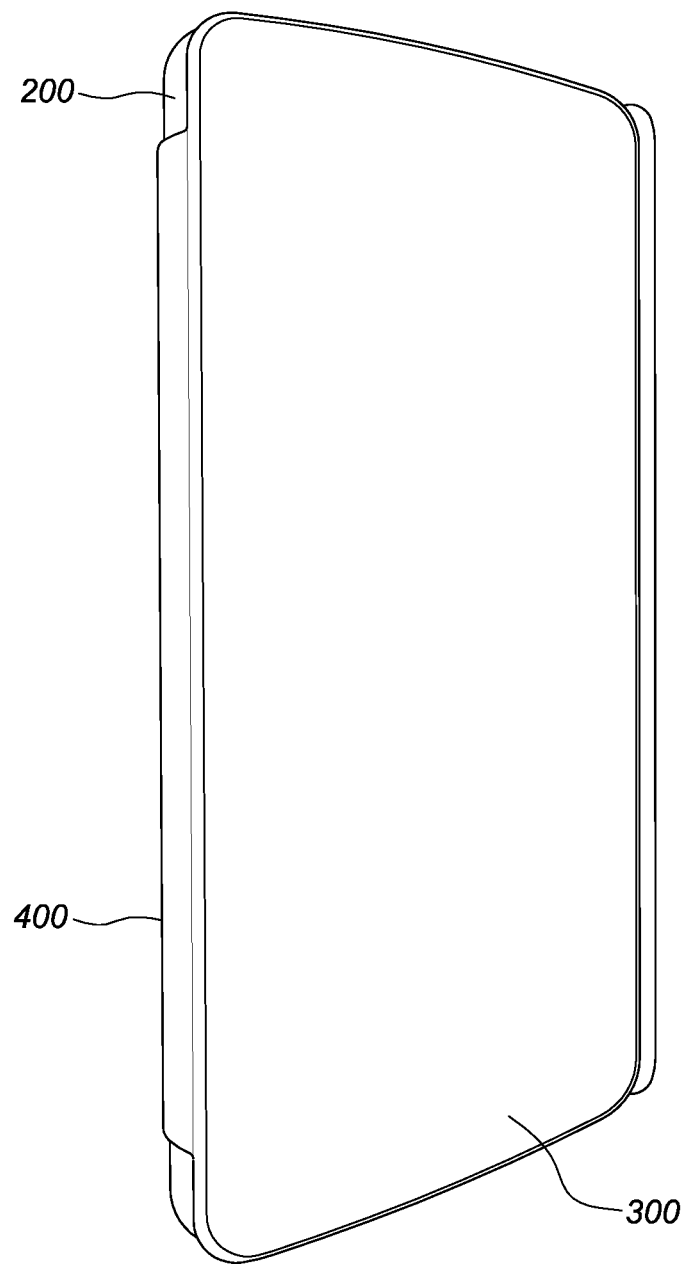
FIG. 7 is a perspective view of a second embodiment of a protective case in a completely closed position such that the cover is folded over the shell component. In this second embodiment, the inner and outer layers do not cover as much of the faces of the shell component as the first embodiment illustrated in FIGS. 1-6F.
Figure 8:
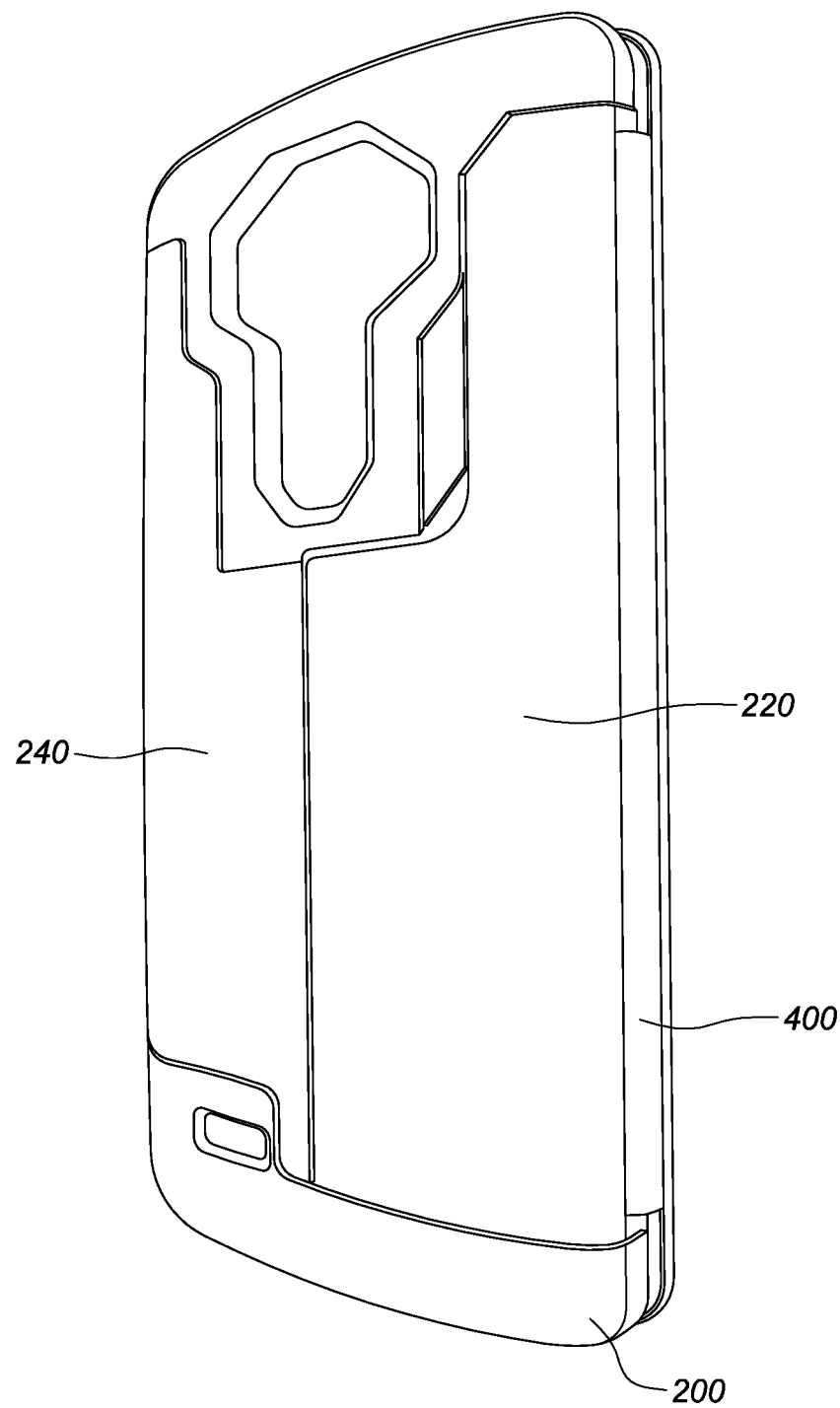
FIG. 8 is an opposite perspective view of the protective case of FIG. 7 in the completely closed position such that the shell is folded over the cover component.
Figure 9:
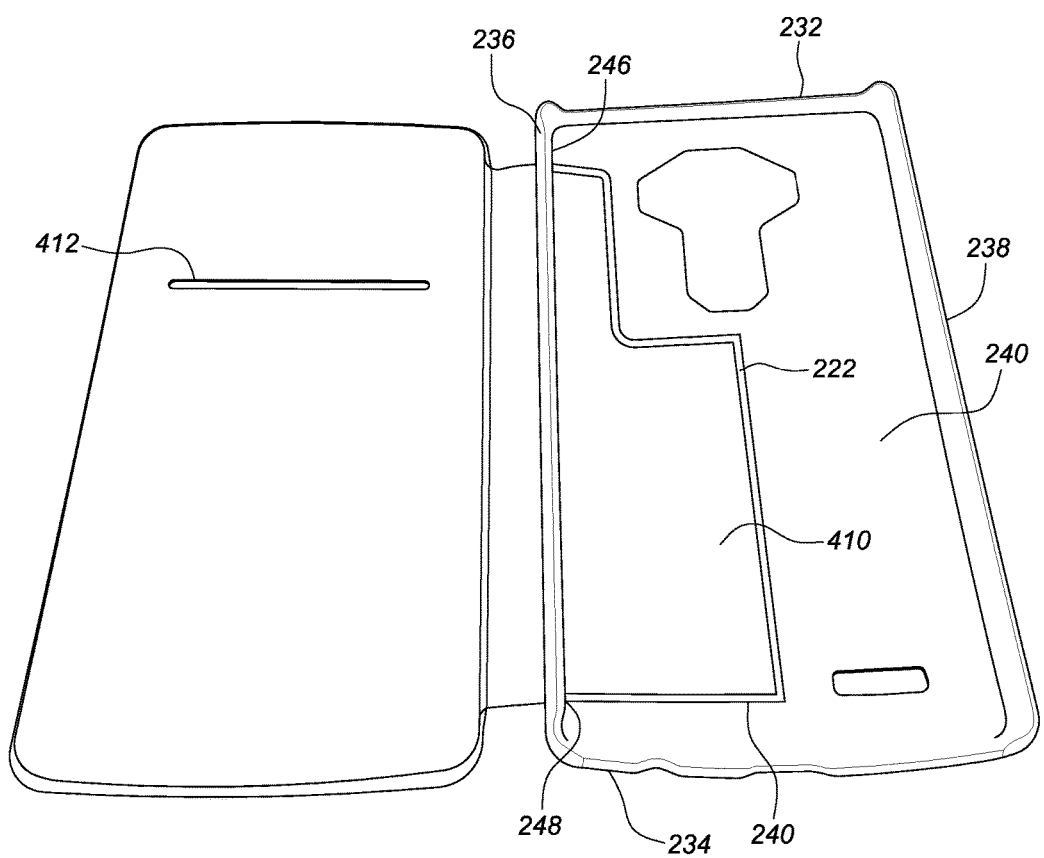
FIG. 9 is an internal perspective view of the protective case of FIG. 7 showing the internal faces of the case and a first viewing/operating position or configuration with the cover swung open at the spine with the subpanel of the shell remaining attached to the main panel of the shell.
Figure 10:
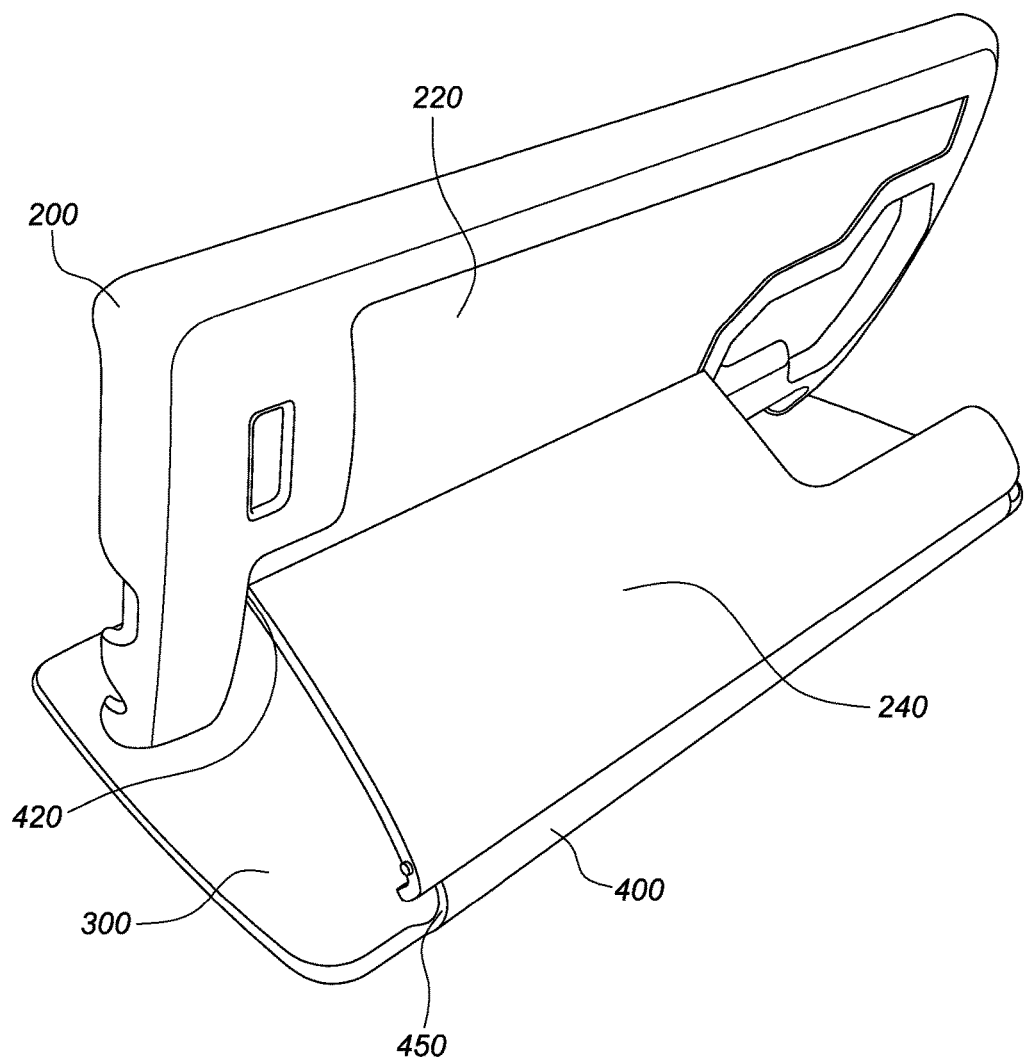
FIG. 10 is a perspective views of the protective case of FIG. 7 with the shell folded at the spine over the cover and the main panel of the shell detached from the subpanel of the shell and rotated along the hinge there-between and the edge of the main panel of the shell resting on the inner face of the cover so as to form a third viewing/operating position(s) or configuration(s) like that depicted in FIGS. 6A-6F.

In the embodiment illustrated in FIGS. 1-6F, the hinge 420 is formed by the opposing inner and/or outer layers 410, 430 of the connector component that extends between the main panel 220 and the subpanel 240 of the shell 200. In the embodiment illustrated in FIGS. 7-10 the hinge 410 is formed via a mechanical pin and socket connection molded into respective regions of the main panel 220 and subpanel 240. Other rotatable joint connections or conventional hinge connections maybe be employed.

The main panel 220 may also include additional apertures including a camera lens aperture 226 and a speaker and/or microphone aperture 228. Apertures may also be included in the subpanel 240, for example if the subpanel is configured to cover features on the mobile device.

The inner faces of the main panel 220 and subpanel 240 of the shell 200 include recessed regions or attachment areas 222 and 242 that are dimensioned to receive correspondingly dimensioned inner layer 410 liner regions of the connector component 400. Similarly, the outer faces of the main panel 220 and subpanel 240 of the shell 200 include recessed regions 224 and 244 that are dimensioned to receive correspondingly dimensioned outer layer 430 regions of the connector component 400. Incorporating recessed regions 222, 242, 224, 244 in the inner and outer faces can mitigate the likelihood that the overlying layers 410 and 430 will peel-off from the underlying shell surface with use. The recessed regions are configured such that the outer surfaces of the overlaid layers would reside at or below the outer surfaces of the adjacent surrounding regions of the shell 200. In this way the inner and outer layers are effectively protected by being embedded within the corresponding inner and outer surfaces of the shell 200. Notably, in the embodiment illustrated in FIGS. 7-10 there are no recessed regions on the outer or inner faces of the main panel 220 in that the outer and inner layers 430, 410 are not configured to overlay the main panel 220 but only the subpanel 240.

The subpanel 240 on one side is anchored to the cover via the connector portion 400 and on the other side is connected to the main panel 220 via a hinge 410. In order to avoid having the subpanel 240 rotate or swing inwardly through the aperture and into the compartment 205 defined by the main panel 220, the subpanel 240 includes lips 258 along its opposing top and bottom edges 252, 254 that are configured to engage correspondingly dimensioned indentations on the outer surface of the main panel 240 around the perimeter of the aperture 221 so as to provide a mechanical stop.

The shell component 200 may be made of any suitable material. For example, the shell component 200 may be manufactured via injection molding using a suitable polymer such as polycarbonate and/or fiber (e.g., carbon or Kevlar) reinforced plastic. The main panel 220 of the shell 200 may be formed of the same or different material than the subpanel 240 of the shell. For example, the main panel may be formed of a more rigid material than the subpanel or vice versa.

The cover component 300 is configured to cover the front face of the mobile device when the case 100 is completely closed and is defined by top 332, bottom 334, left 336 and right 338 sides that correspond to the top 232, bottom 234, left 236, and right 238 sides of the shell 200 when the case 100 is in the completely closed position and the cover 300 is on top of the shell 200. The cover component 300 is comprised of a cover panel 305, which is overlaid on opposing sides with the inner and outer layers 410 and 430.

One or more slots or openings 412 may be formed into the inner layer 410 over the cover panel 305 to form a wallet or credit card holder. Regions of the inner layer 410 adjacent to the slot 412 are configured to be free to separate from the underlying layer or cover panel 305 to allow the credit card or similar item to slide through the slot 412 and be sandwiched at least partially into the gap or space between the inner layer 410 and the cover panel 305.

The cover component 300 may be made of any suitable material capable of having the planar stability or rigidity suitable for maintaining sufficient perimeter area to cover the screen surface area of the mobile device contained within the shell. Accordingly, the cover panel may be formed of any suitable polymer, such as those described in the construction of the shell, metal, paper, wood, or cardboard, or combination thereof.

The connector component 400 interconnects the cover to the shell component and is comprised of overlaid opposing outer and inner layers 430, 410 that sandwich the cover panel 305 and attach to the recessed regions of the shell component 200 as previously described. The connector component 400 may form the spine portion 450 in the regions between the cover and the shell. The spine 450 is configured to be flexible and adapted to allow relative movement between the shell and cover components and to allow the cover 300 to open and close over the shell 200 when the case is opened and closed.

The outer layer 430 is preferably formed of a flexible yet durable material (e.g., polyurethane or synthetic leather). The inner layer 410, on the other hand, is configured to be in contact with the surfaces of the mobile device and therefore may be made of a soft lining material such as a micro fabric or synthetic felt to further protect and/or avoid scratching the mobile device.

The inner and outer layers 410, 430 may be attached or adhered to one another and the interposed components (e.g., the shell panels and cover panel) via any suitable method including mechanical stitching, chemical adhesion, glue, heat sealing, or combination thereof. In order to bias the subpanel to the closed position, the layers 410, 430 may be adhered to each of the shell panels 220 and 240 when they are oriented in the closed position. The outer layers will therefore be biased (perhaps only slightly) against the subpanel 240 opening or hinging away from the main panel 220 of the shell 200.

In operation, when the case 100 is open, the subpanel 240, which is anchored to the spine 450 and therefore the cover 300, may be detached by the user from the main panel 220 of the shell 200 and thereby allow the main panel 220 to pivotally rotate at the hinge 420 relative to the subpanel 240 so that the case 100 can be folded over itself to form different viewing or operating positions as illustrated in the drawings. Hence snapping the subpanel 240 into and out of the main panel 220 of the shell 200 allows for additional or more versatile operating configuration of the case.

For example, once the subpanel 240 is detached or disengaged from main panel 220, the main panel 220 can rotate at the hinge 420 (between the subpanel and main panel) away from the spine 450 over the inner face of the cover 300. Once rotated over the inner face of the cover 300, the proximate edge of the main panel 220 of the shell 200 (i.e., the left side edge 236) can be position to sit atop the inner face of the cover panel 305 to provide the desired an angled viewing position.

Retention of the case in the desired viewing position, is facilitated by the force resulting from the weight of the mobile device contained within the case. Thus, the case may be manufactured or configured so that it would not hold an angled viewing position by itself without the mobile device contained therein. Rather, the case 100, as previously described, may be configured to be bias to a closed position where the subpanel 240 and main panel 220 are generally parallel to one another and not rotated relative to one another. By using the weight of the mobile device to provide the added weight or force necessary to bias the case into a desired viewing or operating position, the case can be manufactured using light-weight materials.

A corresponding method of manufacture is also disclosed. A shell component (including a main panel and subpanel) and a cover component as each is described above is molded or formed and then overlaid on their inner and outer faces with the flexible inner and outer layers. A hinge, which connects the subpanel to an aperture in the main panel of the shell, is provided between the subpanel and the main panel along a first side or location. The hinge may be formed by the overlaid inner and/or outer layers. The inner and/or outer layers may be overlaid when the subpanel and the main panel are in the closed position to bias those panels into the closed position. Slots are formed in the inner layer over the cover panel to form a wallet or credit card holder. Regions of the inner layer adjacent to the slot are configured to be free to separate from the underlying layer to allow the credit card or similar item to slide through the slot and at least partially into the gap or space between the two layers and/or the cover pane.

Although various aspects are herein disclosed in the context of certain preferred embodiments, implementations, and examples, it will be understood by those skilled in the art that the present invention extends beyond the specifically disclosed embodiments to other alternative embodiments and/or uses of the inventive aspects and obvious modifications and equivalents thereof. In addition, while a number of variations of the aspects have been noted, other modifications, which are within their scope, will be readily apparent to those of skill in the art based upon this disclosure. It should be also understood that the scope this disclosure includes the various combinations or sub-combinations of the specific features and aspects of the embodiments disclosed herein, such that the various features, modes of implementation and operation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

This in this regard, it should be understood that each of the foregoing and various features, constructions, configurations, and aspects, together with those set forth in the claims and summarized above or otherwise disclosed herein, including the drawings, may alone or in any combination form claims for a case device, apparatus, system, method of manufacture, and/or use without limitation.

What is claimed is:

1. A method of manufacturing a protective case for a mobile device, comprising:
    providing a shell portion made of a first material that is dimensioned to cover at least a portion of the rear face of the mobile device and retentively house the mobile device within a compartment formed within the shell portion, the shell portion includes a first piece and a second piece connected to said first piece by a hinge, each of the first and second pieces has an inner side and an outer side, each of the inner and outer sides of the first and second pieces includes recessed regions;
    providing a flexible spine portion;
    providing a cover portion dimensioned to cover the front face of the mobile device, the cover portion being attached to the shell portion through the spine portion;
    providing an outer layer covering the recessed regions on the outer sides of both the first and second pieces;
    connecting the cover component to the second piece of the shell portion via a spine; and
    providing an inner layer covering the recessed regions on the inner side of both the first and second pieces, wherein the second piece is configured to pivot away from the first piece so that the case can be folded into multiple positions.

2. The method of manufacturing of claim 1, wherein the shell is formed of a different material than the cover portion.

3. The method of manufacturing of claim 1, wherein the cover portion is attached to recessed regions provided in the shell.

4. A protective case for a mobile electronic device configured to be user removable from said mobile electronic device, said protective case comprising:
    a shell portion made of a first material that is dimensioned to cover at least a portion of the rear face of the mobile device and retentively house the mobile device within a compartment formed within the shell portion, the shell portion includes a first piece and a second piece connected to said first piece by a hinge, each of the first and second pieces has an inner side and an outer side, each of the inner and outer sides of the first and second pieces includes recessed regions;
    a flexible spine portion;
    a cover portion dimensioned to cover the front face of the mobile device, the cover portion being attached to the shell portion through the spine portion;
    an outer layer covering the recessed regions on the outer sides of both the first and second pieces; and
    an inner layer covering the recessed regions on the inner side of both the first and second pieces, wherein the second piece is configured to pivot away from the first piece so that the case can be folded into multiple positions.

5. The protective case of claim 4, wherein the inner and outer layers form the hinge.

6. The protective case of claim 4, wherein the multiple positions include a configuration wherein the edge of the main panel rests on the inside face of the cover portion.

7. The protective case of claim 4, wherein the second piece is reversibly attached to the first piece at a second location via attachment protrusions.

8. The protective case of claim 4, wherein the inner layer and the outer layer are directly attached to each other at the spine portion.

9. The protective case of claim 4, wherein the recessed region of the first piece includes a first recessed region and the recessed region of the second piece includes a second recessed region.

10. The protective case of claim 9, wherein the first recessed region covered by the outer layer is formed on the outer surface of the first piece.

11. The protective case of claim 9, wherein the first recessed region covered by the outer layer is formed on the outer surface of the second piece.

12. The protective case of claim 9, wherein the first recessed region covered by the outer layer is formed on the outer surface of both the first piece and the second piece of the shell.

13. The protective case of claim 9, wherein the second recessed region covered by the inner layer is formed on the outer surface of the first piece.

14. The protective case of claim 9, wherein the second recessed region covered by the inner layer is formed on the outer surface of the second piece.

15. The protective case of claim 9, wherein the second recessed region covered by the inner layer is formed on the outer surface of both the first piece and the second piece of the shell.

16. A protective case for a mobile electronic device configured to be user removable from said mobile electronic device, said protective case comprising:
    a shell portion made of a first material that is dimensioned to cover at least a portion of the rear face of the mobile device and retentively house the mobile device within a compartment formed within the shell portion, the shell portion includes a first piece and a second piece connected to said first piece by a hinge, each of the first and second pieces has an inner side and an outer side, each of the inner and outer sides of the first and second pieces includes recessed regions;
    a flexible spine portion;
    a cover portion having an inside face and outside face and being dimensioned to cover the front face of the mobile device when the mobile device is retentively received within the shell portion and the case is in a closed position, the cover portion being attached to the shell portion through the spine portion;
    an outer layer covering the recessed regions on the outer sides of both the first and second pieces; and
    an inner layer covering the recessed regions on the inner side of both the first and second pieces, wherein the second piece is configured to pivot away from the first piece so that the case can be folded into multiple positions;
    wherein the hinge is formed of the inner and outer layers.

17. The protective case of claim 16, wherein the recessed region of the first piece includes a first recessed region and the recessed region of the second piece includes a second recessed region.

18. The protective case of claim 16, wherein the second piece is reversibly attached to the first piece at a second location via attachment protrusions.

19. The protective case of claim 16, wherein the first recessed region covered by the outer layer is formed on the outer surface of both the first piece and the second piece of the shell.

20. The protective case of claim 16, wherein the second recessed region covered by the inner layer is formed on the outer surface of both the first piece and the second piece of the shell.

* * * * *